(12) United States Patent
Kohler et al.

(10) Patent No.: US 7,153,432 B2
(45) Date of Patent: *Dec. 26, 2006

(54) METHOD OF PURIFYING FISCHER-TROPSCH DERIVED WATER

(75) Inventors: Luis Pablo Fidel Dancuart Kohler, Vaalpark (ZA); Gert Hendrik Du Plessis, Secunda (ZA); Francois Jacobus Du Toit, Sasolburg (ZA); Edward Ludovicus Koper, Secunda (ZA); Trevor David Phillips, Vanderbijlpark (ZA); Janette Van Der Walt, Vaalpark (ZA)

(73) Assignee: Sasol Technology (Pty) Ltd., Johannesburg (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 11/015,308

(22) Filed: Dec. 16, 2004

(65) Prior Publication Data
US 2005/0139555 A1 Jun. 30, 2005

Related U.S. Application Data

(63) Continuation of application No. PCT/ZA03/00079, filed on Jun. 18, 2003.

(60) Provisional application No. 60/389,653, filed on Jun. 18, 2002.

(30) Foreign Application Priority Data
Jun. 18, 2002 (ZA) ................... 2002/4846

(51) Int. Cl.
*B01D 61/00* (2006.01)
*B01D 15/00* (2006.01)
*B01D 15/04* (2006.01)
*B01D 3/00* (2006.01)

(52) U.S. Cl. ............ 210/640; 210/652; 210/651; 210/638; 210/650; 95/45; 95/46; 95/51; 95/54; 585/331; 585/518; 203/39; 203/40; 518/700

(58) Field of Classification Search ........ 210/650–652, 210/640, 641, 638; 95/45, 46, 51, 54; 585/331; 518/701, 703–704, 700; 422/211; 203/39, 203/94, 98–99, 73
See application file for complete search history.

(56) References Cited

U.S. PATENT DOCUMENTS

| | | | |
|---|---|---|---|
| 4,746,434 A | 5/1988 | Grieves et al. | |
| 4,948,511 A | 8/1990 | Swanson et al. | |
| 5,023,276 A * | 6/1991 | Yarrington et al. | 518/703 |
| 5,606,557 A * | 2/1997 | Kuroshita et al. | 370/364 |
| 6,225,358 B1 | 5/2001 | Kennedy | |
| 6,433,235 B1 * | 8/2002 | Cantrell | 585/331 |
| 6,462,097 B1 | 10/2002 | Martino et al. | |
| 6,585,802 B1 * | 7/2003 | Koros et al. | 95/51 |
| 6,720,558 B1 * | 4/2004 | Kaneyama | 250/311 |
| 6,756,411 B1 * | 6/2004 | Betts et al. | 518/701 |
| 6,797,243 B1 * | 9/2004 | Arcuri et al. | 422/211 |
| 6,809,122 B1 * | 10/2004 | Zhang et al. | 518/700 |
| 6,824,574 B1 * | 11/2004 | O'Rear et al. | 44/448 |
| 7,001,927 B1 * | 2/2006 | Zhang et al. | 518/700 |

FOREIGN PATENT DOCUMENTS

| | | |
|---|---|---|
| DE | 3532390 A | 6/1986 |
| DE | 3803905 A | 8/1989 |
| DE | 19512385 A | 10/1996 |
| FR | 2807027 A | 10/2001 |
| WO | WO 03/048272 A | 6/2003 |
| WO | WO 03/106349 A | 12/2003 |
| WO | WO 03/106354 A1 | 12/2003 |

OTHER PUBLICATIONS

Search Report for Equivalent Application—Great Britain Patent Application No. GB0314071.2, Date of Search Nov. 21, 2003.
Examination Report for Equivalent Application—Great Britain Patent Application No. GB0314071.2, Date of report Dec. 31, 2004.
Search Report for Equivalent Application—Netherlands Patent Application NL 1023691, Filed Jun. 18, 2003, Dated of Report Dec. 1, 2003.

Abstract for South African Patent Application No. ZA 8401928A (WPI abstract accession No. 1985-050193/198508, Derwent, May 3, 1985).

English Language Abstract for German Patent Application No. DE 3532390 A.

English Language Abstract for German Patent Application No. DE 3803905 A.

English Language Abstract for German Patent Application No. DE 19512385 A.

English Language Abstract for French Patent Application No. FR 2807027 A.

U.S. Appl. No. 11/015,654, filed Dec. 16, 2004 to Kohler, et al.

PCT International Search Report for PCT/ZA03/00079.

PCT Written Opinion for PCT/ZA03/00079.

PCT International Preliminary Examination Report for PCT/ZA03/00079.

\* cited by examiner

*Primary Examiner*—Ana Fortuna
(74) *Attorney, Agent, or Firm*—Knobbe Martens Olson & Bear LLP

(57) ABSTRACT

A process for the production of highly purified water 38 from Fischer-Tropsch reaction water 12, includes at least the steps of a primary treatment stage comprising an equilibrium staged separation process 14 having at least one stage for removing at least a fraction of non-acid oxygenated hydrocarbons from the Fischer-Tropsch reaction water 12 to produce a primary water-enriched stream 16, a secondary treatment stage comprising at least one membrane separation process 28 for removing at least some suspended solids and acidic oxygenated hydrocarbons from at least a portion of the primary water-enriched stream 16 to produce a secondary water-enriched stream 34 and a tertiary treatment stage comprising a dissolved salt and organic removal stage 36 for removing at least some dissolved salts and organic constituents from at least a portion of the secondary water-enriched stream 34.

22 Claims, 1 Drawing Sheet

METHOD OF PURIFYING FISCHER-TROPSCH DERIVED WATER

RELATED APPLICATIONS

This application is a continuation, under 35 U.S.C. § 120, of International Patent Application No. PCT/ZA03/00079, filed on Jun. 18, 2003, under the Patent Cooperation Treaty (PCT), which was published by the International Bureau in English on Dec. 24, 2003, which designates the United States and claims the benefit of U.S. Provisional Patent Application No. 60/389,653, filed Jun. 18, 2002, and South Africa Application No. 2002/4846, filed Jun. 18, 2002, the disclosures of each of which are hereby incorporated by reference in their entireties and are hereby made a part of this specification.

FIELD OF THE INVENTION

This invention relates to the purification of water produced during Fischer-Tropsch synthesis for which synthesis a variety of carbonaceous materials are used as feedstock.

BACKGROUND OF THE INVENTION

The applicant is aware of processes for the synthesis of water from a carbonaceous feedstock, such as natural gas and coal, which processes also produce hydrocarbons.

One such process is the Fischer-Tropsch process of which the largest product is water and, to a lesser extent, hydrocarbons including olefins, paraffins, waxes, and oxygenates. There are numerous references to this process such as, for example on pages 265 to 278 of "Technology of the Fischer-Tropsch process" by Mark Dry, Catal. Rev. Sci. Eng., Volume 23 (1&2), 1981.

The products from the Fischer-Tropsch process may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

In certain areas where carbonaceous feedstocks are to be found, water is in short supply and a relatively costly commodity. Also, environmental concerns prevent the dumping of polluted water derived from the Fischer-Tropsch process into natural water ways and the sea thereby presenting a case for the production and recovery of useable water at the source of the carbonaceous feedstocks.

The carbonaceous feedstocks typically include coal and natural gas that are converted to hydrocarbons, water and carbon dioxide during Fischer-Tropsch synthesis. Naturally, other carbonaceous feedstocks such as, for example, methane hydrates found in marine deposits can also be used.

Before the water produced during the Fischer-Tropsch process is purified in accordance with the present invention, it is typically subjected to preliminary separation aimed at isolating a water-enriched stream from the Fischer-Tropsch products.

The preliminary separation process includes condensing the gaseous product from the Fischer-Tropsch reactor and separating it in a typical three-phase separator. The three streams exiting the separator are: a tail gas, a hydrocarbon condensate including mainly hydrocarbons in the $C_5$ to $C_{20}$ range and a reaction water stream containing dissolved oxygenated hydrocarbons and suspended hydrocarbons.

The reaction water stream is then separated using a coalescer that separates the reaction water stream into a hydrocarbon suspension and a water-rich stream.

The coalescer is capable of removing hydrocarbons from the reaction water stream to a concentration of between 10 ppm and 1000 ppm, typically 50 ppm.

The water-enriched stream thus obtained forms the feedstock for the method according to the present invention and will be denoted in this specification by the term "Fischer-Tropsch reaction water".

The composition of the water-enriched stream or reaction water is largely dependent on the metal used in the Fischer-Tropsch catalyst and the reaction conditions (e.g. temperature, pressure) employed. The Fischer-Tropsch reaction water can contain oxygenated hydrocarbons including aliphatic, aromatic and cyclic alcohols, aldehydes, ketones and acids, and to a lesser extent aliphatic, aromatic and cyclic hydrocarbons such as olefins and paraffins.

The Fischer-Tropsch reaction water may also contain small quantities of inorganic compounds including metals from the Fischer-Tropsch reactor, as well as nitrogen and sulphur containing species that originate from the feedstock.

The influence of the type of Fischer-Tropsch synthesis used on the quality of Fischer-Tropsch reaction water is illustrated in typical organic analysis (Table 1) of Fischer-Tropsch reaction water generated from three different synthesis operating modes, namely:

TABLE 1

Typical Organic Composition of Fischer-Tropsch reaction water from Different Fischer-Tropsch Synthesis Operating Modes

| Component (mass %) | LTFT (Cobalt Catalyst) | LTFT (Iron Catalyst) | HTFT (Iron Catalyst) |
|---|---|---|---|
| Water | 98.84 | 95.54 | 94.00 |
| non-acid oxygenated hydrocarbons | 1.075 | 3.830 | 4.80 |
| Acidic oxygenated hydrocarbons | 0.075 | 0.610 | 1.20 |
| Other Hydrocarbons | 0.02 | 0.02 | 0.02 |
| Inorganic components | <0.005 | <0.005 | <0.005 |

It is evident from the typical analyses of Fischer-Tropsch reaction waters of different origin (Table 1) that these waters, in particular HT Fischer-Tropsch reaction water, contain relatively high concentrations of organic compounds, and direct application or disposal of these waters is generally not feasible without further treatment to remove undesirable constituents. The degree of treatment of the Fischer-Tropsch reaction water depends largely on the intended application, and it is possible to produce a wide range of water qualities ranging from boiler feed water to partially treated water which may be suitable for discharge to the environment.

It is also possible to co-treat Fischer-Tropsch reaction water with other typical process waste water as well as rain water.

The water purification processes described in this invention may, after making minor adaptations, also be used for the processing of aqueous streams derived from generic synthesis gas conversion processes using metallic catalysts similar to the catalysts used during Fischer-Tropsch synthesis.

SUMMARY OF THE INVENTION

According to a first aspect of the invention there is provided a process for the production of purified water from Fischer-Tropsch reaction water, which process includes at least the steps of:
a) a primary treatment stage comprising an equilibrium staged separation process having at least one stage for removing at least a fraction of non-acid oxygenated hydrocarbons from the Fischer-Tropsch reaction water to produce a primary water-enriched stream; and
b) a secondary treatment stage comprising at least one membrane separation process for removing at least some suspended solids and acidic oxygenated hydrocarbons from at least a portion of the primary water-enriched stream.

The term "purified water" is to be interpreted as meaning an aqueous stream having a COD of between 20 and 500 mg/l, a pH of between 6,0 and 9,0, a suspended solids content of less than 250 mg/l and a total dissolved solids content of less than 600 mg/l.

The non-acid oxygenated hydrocarbons are typically selected from the group including: alcohols, aldehydes and ketones, more specifically from the group including: acetaldehyde, propionaldehyde, butyraldehyde, acetone, methyl propyl ketone, methanol, ethanol, propanol, butanol, pentanol, hexanol, and heptanol.

The suspended solids are typically catalyst particles.

The acidic oxygenated hydrocarbons are typically selected from the group including: formic acid, acetic acid, propionic acid, butyric acid, valeric acid, hexanoic acid, heptanoic acid and octanoic acid.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g. acetic acid, propionic acid) and optionally trace quantities of non-acid compounds. As a result of the presence of organic acids, FischerTropsch reaction water that has undergone primary treatment is known as Fischer-Tropsch acid water (primary water-enriched stream).

The overheads from distillation may be recovered and worked-up to products, or may be used for fuel or as an energy source.

The primary treatment stage may further include a liquid-liquid separation process such as, for example, liquid-liquid extraction, in which the primary water-enriched stream is separated into an acid-enriched and a primary water-enriched stream.

The acid-enriched stream may be treated further to recover the acids contained in it.

The primary treatment stage may include degassing of the Fischer-Tropsch reaction water before further processing to remove compounds having a very low boiling point and dissolved gases.

Typically, Fischer-Tropsch reaction water originating from HTFT iron catalyst processes which water has undergone primary treatment has limited application due to the relatively high concentrations (>1% by mass) of organic acids remaining in the Fischer-Tropsch acid water, and further treatment of the water is required. In contrast, Fischer-Tropsch reaction water originating from cobalt-based LTFT processes which water has undergone primary treatment contains significantly lower organic acid concentrations (<0.1% by mass) and can therefore, following neutralization, be released to the environment if sufficient dilution is available and discharge standards permit. This water may also have limited application as process water.

A number of membrane separation processes are suitable for use in the secondary treatment stage, depending on which constituent is to be removed.

The membrane processes used in the secondary treatment stage are typically selected from the group including: microfiltration, ultra-filtration, reverse osmosis and pervaporation.

The secondary treatment stage may include a solid-liquid separation step in which microfiltration and/or ultrafiltration is used for the removal of at least a fraction of the suspended solids from the primary water-enriched stream.

Micro-filtration typically includes using capillary polypropylene membranes with a nominal cut-off of 0,2 micrometer or molecular cut-off (MWCO) of 90 000 for removal of catalyst particles at typical pressures of 1 000 kPa, pH at 4 to 7 and temperatures of less than 40° C. Ultra-filtration typically includes using tubular poly-ether sulphone membranes with typically cut-off points of between 10 000 and 40 000 for removal of catalyst particles and suspended oils at typical pressures of less than 2 000 kPa, pH of between 4 and 7 and temperatures of less than 40° C.

The secondary treatment stage may further include one or more liquid-liquid separation steps in which reverse osmosis and/or pervaporation is used to remove at least a fraction of the organic compounds in the primary water-enriched stream. Reverse osmosis may be implemented using either a spiral or a tubular configuration and pervaporation is typically applied using membrane distillation.

Reverse osmosis typically includes using spiral wound poly-amide membranes with point rejection of better than 99,6% (typically sea-water membranes) or poly-ether composite membranes with a point rejection of better than 99,6% for removal of organic substances at typical pressures of less than 60 bar, pH of 4 to 7 and temperatures of less than 40° C.

Pervaporation typically includes using flat sheet, chemically cross linked poly-vinyl alcohol membranes or a polymer blend of poly-vinyl alcohol and poly-acrylic acid membranes for removal of organics which do not form azeotropes and at typical pressures of less than 4 mm Hg, pH of ca 7 and temperatures of between 30 and 70° C.

The pH of the primary water-enriched stream may be adjusted prior to organic removal thereby to convert organic acids into organic salts. Since organic salts are rejected by membranes more readily than organic acids are, pH adjustment in effect maximizes and economizes the removal of organic constituents.

The liquid-liquid separation step results in the production of stream of purified water and a stream enriched with organic constituents. The organic constituents are typically fatty acids.

The purified water may be subjected to a further liquid-liquid separation step (or steps) as described above to further reduce the amount of organic constituents contained therein.

Applications for the purified water produced by the method described above may include its use as cooling water, make up, and irrigation water.

The purified water typically has the following characteristics:

| Property | | |
|---|---|---|
| Chemical Oxygen Demand (COD) | mg/l | 20–500 |
| pH | | 6.0–9.0 |
| Total Dissolved Solids (TDS) | mg/l | <600 |
| Suspended solids | mg/l | <250 |

According to a second aspect of the invention there is provided a process for the production of highly purified water from Fischer-Tropsch reaction water, which process includes at least the steps of:

a) a primary treatment stage comprising an equilibrium staged separation process having at least one stage for removing at least a fraction of non-acid oxygenated hydrocarbons from the Fischer-Tropsch reaction water to produce a primary water-enriched stream;

b) a secondary treatment stage comprising at least one membrane separation process for removing at least some suspended solids and acidic oxygenated hydrocarbons from at least a portion of the primary water-enriched stream to produce a secondary water-enriched stream; and c) a tertiary treatment stage comprising a dissolved salt and organic removal stage for removing at least some dissolved salts and organic constituents from at least a portion of the secondary water-enriched stream.

The term "highly purified water" is to be interpreted as meaning an aqueous stream having a COD of less than 50 mg/l, a pH of between 6,0 and 9,0, a suspended solids content of less than 50 mg/l and a total dissolved solids content of less than 100 mg/l.

The non-acid oxygenated hydrocarbons are typically selected from the group including: alcohols, aldehydes and ketones, more specifically from the group including: acetaldehyde, propionaldehyde, butyraldehyde, acetone, methyl propyl ketone, methanol, ethanol, propanol, butanol, pentanol, hexanol and heptanol.

The suspended solids are typically catalyst particles.

The acidic oxygenated hydrocarbons are typically selected from the group including: formic acid, acetic acid, propionic acid, butyric acid, valeric acid, hexanoic acid, heptanoic acid and octanoic acid.

The dissolved salts removed during the tertiary stage are typically selected from the group including: calcium and sodium salts as well as traces of magnesium, iron and other salts.

The organic constituents removed during the tertiary treatments stage are typically selected from the group comprising: acetaldehyde, propionaldehyde, butyraldehyde, acetone, methyl propyl ketone, methanol, ethanol, propanol, butanol, pentanol, hexanol, heptanol, formic acid, acetic acid, propionic acid, butyric acid, and valeric acid.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g. acetic acid, propionic acid) and optionally trace quantities of non-acid compounds. As a result of the presence of organic acids, Fischer-Tropsch reaction water that has undergone primary treatment is known as Fischer-Tropsch acid water (primary water-enriched stream).

The overheads from distillation may be recovered and worked-up to products, or may be used for fuel or as an energy source.

The primary treatment stage may further include a liquid-liquid separation process such as, for example, liquid-liquid extraction, in which the primary water-enriched stream is separated into an acid-enriched and a primary water-enriched stream.

The acid-enriched stream may be treated further to recover the acids contained in it.

The primary treatment stage may include degassing of the Fischer-Tropsch reaction water before further processing to remove compounds having a very low boiling point and dissolved gases.

Typically, Fischer-Tropsch reaction water originating from HTFT iron catalyst processes which water has undergone primary treatment has limited application due to the relatively high concentrations (>1% by mass) of organic acids remaining in the FT acid water and further treatment of the water is required. In contrast, Fischer-Tropsch reaction water originating from cobalt-based LTFT processes which water has undergone primary treatment contains significantly lower organic acid concentrations (<0.1% by mass) and can therefore, following neutralization, be released to the environment if sufficient dilution is available and discharge standards permit. This water may also have limited application as process water.

A number of membrane separation processes are suitable for use in the secondary treatment stage, depending on which constituent is to be removed.

The membrane processes used in the secondary treatment stage are typically selected from the group including: microfiltration, ultra-filtration, reverse osmosis and pervaporation.

The secondary treatment stage may include a solid-liquid separation step in which microfiltration and/or ultrafiltration is used for the removal of at least a fraction of the suspended solids from the primary water-enriched stream.

Micro-filtration typically includes using capillary polypropylene membranes with a nominal cut-off of 0,2 micrometer or molecular cut-off (MWCO) of 90 000 for removal of catalyst particles at typical pressures of 1 000 kPa, pH at 4 to 7 and temperatures of less than 40° C. Ultra-filtration typically includes using tubular poly-ether sulphone membranes with typically cut-off points of between 10 000 and 40 000 for removal of catalyst particles and suspended oils at typical pressures of less than 2 000 kPa, pH of between 4 and 7 and temperatures of less than 40° C.

The secondary treatment stage may further include one or more liquid-liquid separation steps in which reverse osmosis and/or pervaporation is used to remove at least a fraction of the organic compounds in the primary water-enriched stream. Reverse osmosis may be implemented using either a spiral or a tubular configuration and pervaporation is typically applied using membrane distillation.

Reverse osmosis typically includes using spiral wound poly-amide membranes with point rejection of better than 99,6% (typically sea-water membranes) or poly-ether composite membranes with a point rejection of better than 99,6% for removal of organic substances at typical pressures of less than 60 bar, pH between 4 and 7 and temperatures of less than 40° C.

Pervaporation typically includes using flat sheet, chemically cross linked poly-vinyl alcohol membranes or a polymer blend of poly-vinyl alcohol and poly-acrylic acid membranes for removal of organics which do not form azeotropes and at typical pressures of less than 4 mm Hg, pH of ca 7 and temperatures of between 30 and 70° C.

The pH of the primary water-enriched stream may be adjusted prior to organic removal thereby to convert organic acids into organic salts. Since organic salts are rejected by membranes more readily than organic acids are, pH adjustment in effect maximizes and economizes the removal of organic constituents.

The liquid-liquid separation step results in the production of a stream of purified water and a stream enriched with organic constituents. The organic constituents are typically fatty acids. The purified water may be subjected to a further liquid-liquid separation step (or steps) as described above to further reduce the amount of organic constituents contained therein.

The tertiary treatment stage may include one or more of the following separation methods for the removal of salts from the secondary water-enriched stream: ion exchange and high rejection reverse osmosis.

The tertiary treatment stage may further include one or more of the following separation methods for the removal of organic constituents from the secondary water-enriched stream: use of activated carbon, organic scavenger resins, and chemical oxidation (e.g. ozone and hydrogen peroxides with our without a catalyst or ultraviolet light generated free radicals).

Applications for the highly purified water produced by the method described above may include its use as drinking water and boiler feed water.

The highly purified water typically has the following characteristics:

| Property | | |
|---|---|---|
| Chemical Oxygen Demand (COD) | mg/l | <50 |
| pH | | 6.0–9.0 |
| Total Dissolved Solids (TDS) | mg/l | <100 |
| Suspended solids | mg/l | <50 |

DETAILED DESCRIPTION OF THE PREFERRED EMBODIMENT

Figure 1:
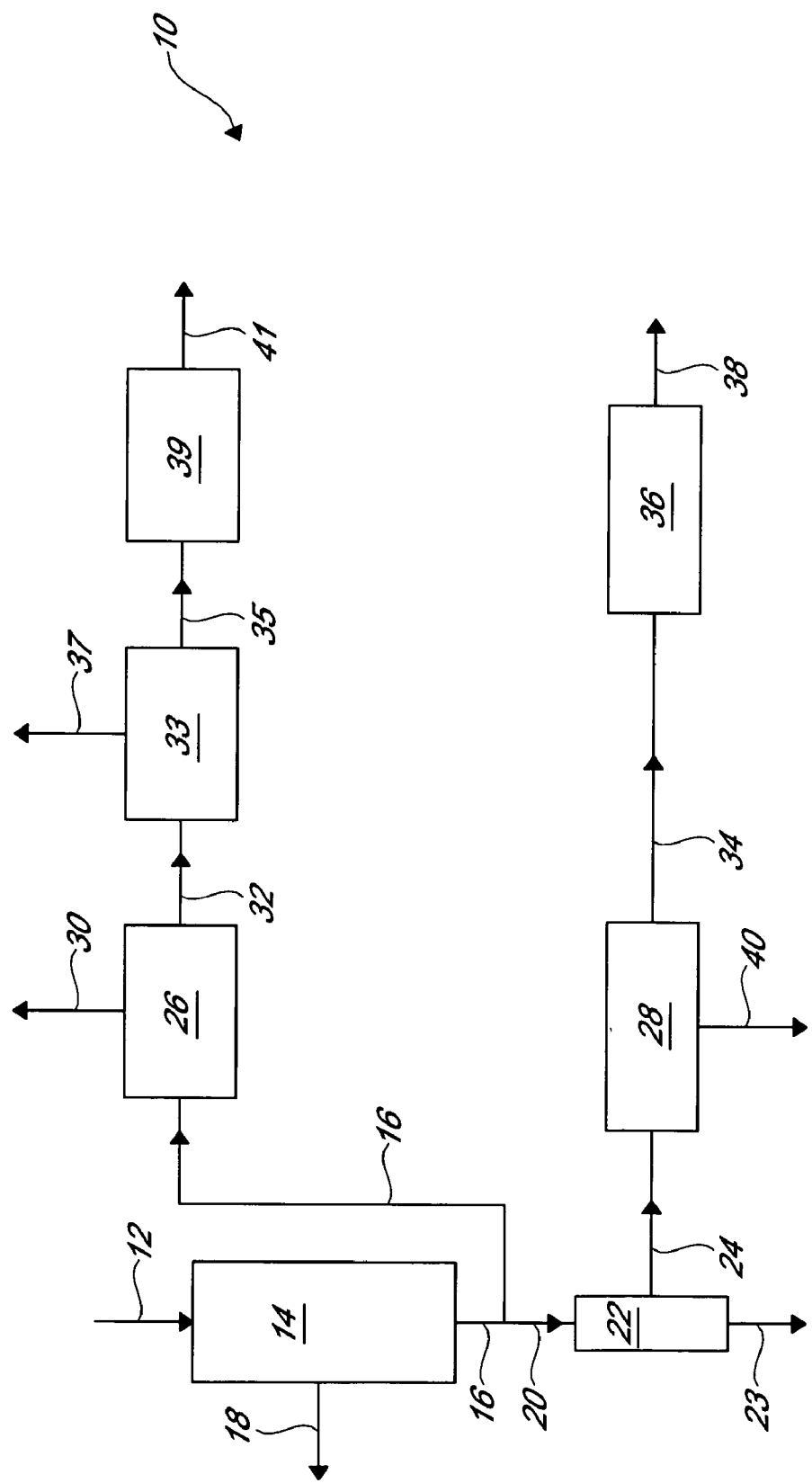
FIG. 1 shows a schematic flow diagram of a process for the production of purified water and/or highly purified water from Fischer-Tropsch reaction water in accordance with the present invention.

The invention will now be described by way of the following non-limiting example with reference to the accompanying drawing.

FIG. 1 shows a schematic flow diagram of a process for the production of purified water and/or highly purified water from Fischer-Tropsch reaction water in accordance with the present invention.

In the drawing, reference numeral 10 generally indicates a process for the production of purified water and/or highly purified water in accordance with the present invention.

EXAMPLE

Treatment of Fischer-Tropsch Reaction Water from an Iron Catalyst HTFT Process

After separation of by-products, a water-enriched stream from an HTFT process was degassed at atmospheric pressure in an open vessel. Free hydrocarbons in the water-enriched stream were reduced to 0.01% (by mass) using a coalescer. Primary treatment of the thus obtained FT reaction water was undertaken using distillation and the compositions of the Fischer-Tropsch reaction water and a primary water-enriched stream are given in Table 2.

TABLE 2

Composition of HTFT reaction water and Fischer-Tropsch acid water (primary water-enriched stream) ie bottoms after primary distillation.

| Component | HTFT Reaction water Feed to primary distillation column (mass %) | Fischer-Tropsch Acid water Bottoms of primary distillation column (mass %) |
|---|---|---|
| Water | 94.00 | 98.799 |
| Total non-acid oxygenated hydrocarbons | 4.80 | 0.001 |
| Total acidic oxygenated hydrocarbons | 1.20 | 1.20 |
| Free hydrocarbons | 0.01 | <0.01 |
| COD (mg/l) | 78 000 | 16 000 |

Primary treatment of the HTFT reaction water 12 was effected using distillation 14 which yielded an acidic bottom or primary water-enriched stream 16 and a stream 18 enriched with non-acid oxygenated hydrocarbons. Analysis of the primary water-enriched stream 16 from the distillation column 14 is detailed in Table 2 above.

It is evident from this analysis that a large fraction of non-acid components was removed from the Fischer-Tropsch reaction water stream 12 during primary distillation 14 leaving an organic acid enriched stream 16 containing 1.25% (by mass) organic acids consisting predominantly of acetic acid. The measured COD of this stream 16 was in the order of 16000 mg $O_2$/l.

For further treatment of the FT acid water stream 16, two alternatives were investigated. In alternative 1, a fraction 20 of the Fischer-Tropsch acid water (primary water-enriched stream 16), was treated in an Acid Extraction plant 22 where about 50% of the organic acids present in stream 20 were extracted using methyl-tertiary-buthyl ether (MTBE) producing an acid rich stream 23 and a water enriched stream 24 known as the acid extraction raffinate. The acid enriched stream 23 could be reworked in the upstream facilities while the raffinate 24 from the extraction plant 22 containing about 0,5% by mass organic acids, was then cooled and sent to a secondary treatment stage comprising membrane separation processes 28. The membrane separation processes consisted of multi-stage spiral reverse osmosis (SRO) units using high rejection poly-amide membranes. Membrane flux was on average 45 LMH (l/m2.h) whilst the water recovery was 90% on average.

Purified water 34 with an average carboxylic acid concentration of 0.05% by mass was produced as well as a concentrated acids stream 40 containing about 6% by mass carboxylic acids. The latter could be reworked in the upstream facilities while tertiary treatment 36 could be applied to the purified water 34. The tertiary treatment stage 36 comprised a polishing step using activated carbon (AC) for removal of the final traces of COD. Activated carbon treatment could effectively reduce the carboxylic acid concentration of stream 16 to 30 mg/l in the highly purified water stream 38 making this water stream 38 suitable to substitute raw water intake.

In alternative 2, stream 16 was cooled prior to ultrafiltration (UF) 26 (using poly-ether-sulphone membranes)

during which mainly fine catalyst particles 30 were removed. UF achieved effective removal of catalyst particles from stream 16 producing a substantially solids-free stream 32. Membrane flux was on average 80 l/m2.h and the silt density index (SDI) of the product stream 32 was consistently less than 3. Water recovery was consistently above 90%.

The resulting stream 32 was then subjected to multi-stage spiral reverse osmosis (SRO) treatment 33 using high rejection poly-amide membranes which treatment 33 yielded a stream of purified water 35.

The stream of purified water 35 produced during SRO treatment 33 contained on average 0,09% by mass carboxylic acids. An acid-enriched stream 37 produced during SRO contained about 6% carboxylic acids. Membrane flux was on average 40 LMH and the water recovery was on average 80%. The acid-enriched stream 37 could be reworked in upstream facilities to recover its acid constituents as product.

The purified water stream 35 was then sent to a tertiary treatment stage comprising a polishing step 39 using activated carbon (AC) for removal of the final traces of COD which step yielded a stream of highly purified water 41.

Activated carbon treatment could effectively reduce the carboxylic acid concentration to 30 mg/l in the highly purified water stream 41 making this water stream 41 suitable to substitute raw water intake.

Depending on the final intended use of the purified 34, 35 or highly purified water 38, 41, the minimum water quality requirements are as set out in Table 3 below and the operating conditions of the equipment used in the method as well as suitable treatment options can be selected accordingly.

TABLE 3

Water Quality - Typical Requirements

|  | Process Water | Irrigation water | Cooling water | Boiler feed water | Drinking water |
|---|---|---|---|---|---|
| COD mg/l | 0–75 |  | 0–30 | 0–10 |  |
| pH | 5–10 | 6.5–8.4 | 6.5–8 | 7–8 | 6–9 |
| TDS mg/l | 0–1600 | <40 | 0–450 | 0–100 | 0–450 |
| SS mg/l | 0–25 | 0–50 | 0–5 | 0–3 | <20 |

It is to be appreciated that the invention is not limited to any specific embodiment or configuration as hereinbefore generally described or illustrated, for example, rain water or water enriched streams from processes other than Fischer-Tropsch synthesis may be purified according to the method described above.

What is claimed is:

1. A process for production of a purified water from a Fischer-Tropsch reaction water, the Fischer-Tropsch reaction water comprising at least one component selected from the group consisting of oxygenated hydrocarbons, aliphatic hydrocarbons, aromatic hydrocarbons, cyclic hydrocarbons, inorganic compounds, and mixtures thereof, wherein the process comprises the steps of:
   a) conducting a distillation or a liquid-liquid extraction of the Fischer-Tropsch reaction water in a primary treatment stage, whereby at least a fraction of non-acid oxygenated hydrocarbons are removed from the Fischer-Tropsch reaction water to produce a primary water-enriched stream; and
   b) subjecting the primary water-enriched stream to a membrane separation process in a secondary treatment stage, whereby at least some suspended solids and acidic oxygenated hydrocarbons are removed from at least a portion of the primary water-enriched stream, whereby a purified water is obtained, the purified water comprising an aqueous stream having a chemical oxygen demand of from 20 to 500 mg/l, a pH of from 6.0 and 9.0, a suspended solids content of less than 250 mg/l, and a total dissolved solids content of less than 600 mg/l.

2. The process as claimed in claim 1, wherein the non-acid oxygenated hydrocarbons are selected from the group consisting of alcohols, aldehydes, ketones, and mixtures thereof, and wherein the acidic oxygenated hydrocarbons are selected from the group consisting of formic acid, acetic acid, propionic acid, butyric acid, valeric acid, hexanoic acid, heptanoic acid, octanoic acid, and mixtures thereof.

3. The process as claimed in claim 1, wherein the membrane processes used in the secondary treatment stage are selected from the group consisting of micro-filtration, ultra-filtration, reverse osmosis, pervaporation, and combinations thereof.

4. The process as claimed in claim 3, wherein micro-filtration comprises micro-filtration with a capillary polypropylene membrane with a nominal cut-off of 0.2 micrometers or a molecular weight cut-off of 90,000 at a pressure of 1,000 kPa, a pH of from 4 to 7, and a temperature of less than 40° C.

5. The process as claimed in claim 3, wherein ultra-filtration comprises ultra-filtration with a tubular poly-ether sulphone membrane with a molecular weight cut-off of from 10,000 to 40,000 at a pressure of less than 2,000 kPa, a pH of from 4 to 7, and a temperature of less than 40° C.

6. The process as claimed in claim 3, wherein reverse osmosis comprises reverse osmosis with a spiral wound poly-amide membrane with a point rejection of greater than 99.6%.

7. The process as claimed in claim 3, wherein reverse osmosis comprises reverse osmosis with a poly-ether composite membrane with a point rejection of greater than 99.6% at a pressure of less than 60 bar, a pH of from 4 to 7, and a temperature of less than 40° C.

8. The process as claimed in claim 3, wherein pervaporation comprises pervaporation by membrane distillation.

9. The process as claimed in claim 1, wherein a pH of the primary water-enriched stream is adjusted prior to step b), thereby converting organic acids into organic salts.

10. A process for production of a purified water from a Fischer-Tropsch reaction water, the Fischer-Tropsch reaction water comprising at least one component selected from the group consisting of oxygenated hydrocarbons, aliphatic hydrocarbons, aromatic hydrocarbons, cyclic hydrocarbons, inorganic compounds, and mixtures thereof, wherein the process comprises the steps of:
   a) conducting a distillation or a liquid-liquid extraction of the Fischer-Tropsch reaction water in a primary treatment stage, whereby at least a fraction of non-acid oxygenated hydrocarbons are removed from the Fischer-Tropsch reaction water to produce a primary water-enriched stream; and
   b) subjecting the primary water-enriched stream to a membrane separation process in a secondary treatment stage, whereby at least some suspended solids and acidic oxygenated hydrocarbons are removed from at least a portion of the primary water-enriched stream, whereby a purified water is obtained, the purified water comprising an aqueous stream having a chemical oxygen demand of from 20 to 500 mg/l, a pH of from 6.0 and 9.0, a suspended solids content of less than 250 mg/l, and a total dissolved solids content of less than 600 mg/l, wherein the membrane separation process is pervaporation with at least one membrane selected from the group consisting of a flat sheet membrane, a chemically cross linked poly-vinyl alcohol membrane, and a membrane comprising a polymer blend of poly-vinyl alcohol and poly-acrylic acid membrane, whereby organics which do not form azeotropes at a pressure of less than 4 mm Hg, a pH of about 7, and a temperature of from 30° C. to 70° C. are removed.

11. A process for production of a highly purified water from a Fischer-Tropsch reaction water, the Fischer-Tropsch reaction water comprising at least one component selected from the group consisting of oxygenated hydrocarbons, aliphatic hydrocarbons, aromatic hydrocarbons, cyclic hydrocarbons, inorganic compounds, and mixtures thereof, wherein the process comprises the steps of:
   a) conducting a distillation or a liquid-liquid extraction of the Fischer-Tropsch reaction water in a primary treatment stage, whereby at least a fraction of non-acid oxygenated hydrocarbons are removed from the Fischer-Tropsch reaction water to produce a primary water-enriched stream;
   b) subjecting the primary water-enriched stream to a membrane separation process in a secondary treatment stage, whereby at least some suspended solids and acidic oxygenated hydrocarbons are removed from at least a portion of the primary water-enriched stream to produce a secondary water-enriched stream; and
   c) removing at least some dissolved salts and organic constituents from at least a portion of the secondary water-enriched stream in a tertiary treatment stage, whereby a highly purified water is obtained, the highly purified water comprising an aqueous stream having a chemical oxygen demand of less than 50 mg/l, a pH of from 6.0 to 9.0, a suspended solids content of less than 50 mg/l, and a total dissolved solids content of less than 100 mg/l.

12. The process as claimed in claim 11, wherein the non-acid oxygenated hydrocarbons are selected from the group consisting of alcohols, aldehydes, ketones, and mixtures thereof, and wherein the acidic oxygenated hydrocarbons are selected from the group consisting of formic acid, acetic acid, propionic acid, butyric acid, valeric acid, hexanoic acid, heptanoic acid, octanoic acid, and mixtures thereof.

13. The process as claimed in claim 11, wherein the membrane processes used in the secondary treatment stage are selected from the group consisting of micro-filtration, ultra-filtration, reverse osmosis, pervaporation, and combinations thereof.

14. The process as claimed in claim 13, wherein micro-filtration comprises micro-filtration with a capillary polypropylene membrane with a nominal cut-off of 0.2 micrometers or a molecular weight cut-off of 90,000 at a pressure of 1,000 kPa, a pH of from 4 to 7, and a temperature of less than 40° C.

15. The process as claimed in claim 13, wherein ultra-filtration comprises ultra-filtration with a tubular poly-ether sulphone membrane with a molecular weight cut-off of from 10,000 to 40,000 at a pressure of less than 2,000 kPa, a pH of from 4 to 7, and a temperature of less than 40° C.

16. The process as claimed in claim 13, wherein reverse osmosis comprises reverse osmosis with a spiral wound poly-amide membrane with a point rejection of greater than 99.6%.

17. The process as claimed in claim 13, wherein reverse osmosis comprises reverse osmosis with a poly-ether composite membrane with a point rejection of greater than 99.6% at a pressure of less than 60 bar, a pH of from 4 to 7, and a temperature of less than 40° C.

18. The process as claimed in claim 13, wherein pervaporation comprises pervaporation by membrane distillation.

19. The process as claimed in claim 11, wherein a pH of the primary water-enriched stream is adjusted prior to step b), thereby converting organic acids into organic salts.

20. A process for production of a highly purified water from a Fischer-Tropsch reaction water, the Fischer-Tropsch reaction water comprising at least one component selected from the group consisting of oxygenated hydrocarbons, aliphatic hydrocarbons, aromatic hydrocarbons, cyclic hydrocarbons, inorganic compounds, and mixtures thereof, wherein the process comprises the steps of:
   a) conducting a distillation or a liquid-liquid extraction of the Fischer-Tropsch reaction water in a primary treatment stage, whereby at least a fraction of non-acid oxygenated hydrocarbons are removed from the Fischer-Tropsch reaction water to produce a primary water-enriched stream:
   b) subjecting the primary water-enriched stream to a membrane separation process in a secondary treatment stage, whereby at least some suspended solids and acidic oxygenated hydrocarbons are removed from at least a portion of the primary water-enriched stream to produce a secondary water-enriched stream, wherein the membrane processes used in the secondary treatment stage is pervaporation with at least one membrane selected from the group consisting of a flat sheet membrane, a chemically cross linked poly-vinyl alcohol membrane, and a membrane comprising a polymer blend of poly-vinyl alcohol and poly-acrylic acid membrane, whereby organics which do not form azeotropes at a pressure of less than 4 mm Hg, a pH of about 7, and a temperature of from 30° C. to 70° C. are removed; and
   c) removing at least some dissolved salts and organic constituents from at least a portion of the secondary water-enriched stream in a tertiary treatment stage, whereby a highly purified water is obtained, the highly purified water comprising an aqueous stream having a chemical oxygen demand of less than 50 mg/l, a pH of from 6.0 to 9.0, a suspended solids content of less than 50 mg/l, and a total dissolved solids content of less than 100 mg/l.

21. The process as claimed in claim 11, wherein the organic constituents removed during the tertiary treatment stage are selected from the group consisting of acetaldehyde, propionaldehyde, butyraldehyde, acetone, methyl propyl ketone, methanol, ethanol, propanol, butanol, pentanol, hexanol, heptanol, formic acid, acetic acid, propionic acid, butyric acid, valeric acid, and mixtures thereof.

22. The process as claimed in claim 11, wherein step c) comprises removing dissolved salts from the secondary water-enriched stream by a method selected from the group consisting of ion exchange, high rejection reverse osmosis, methods using activated carbon, methods using organic scavenger resins, methods using chemical oxidation, and combinations thereof.

* * * * *